US012221370B2

(12) United States Patent
Peng et al.

(10) Patent No.: US 12,221,370 B2
(45) Date of Patent: Feb. 11, 2025

(54) DEVICE AND METHOD FOR ENHANCING NITROGEN AND PHOSPHORUS REMOVAL BASED ON MULTISTAGE AO PARTIAL DENITRIFICATION COUPLED WITH ANAMMOX IN COMBINATION WITH SLUDGE HYDROLYTIC ACIDIFICATION

(71) Applicant: Beijing University of Technology, Beijing (CN)

(72) Inventors: Yongzhen Peng, Beijing (CN); Qi Zhao, Beijing (CN); Ruitao Gao, Beijing (CN); Jianwei Li, Beijing (CN); Liyan Deng, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 17/642,146

(22) PCT Filed: Jul. 21, 2021

(86) PCT No.: PCT/CN2021/107609
§ 371 (c)(1),
(2) Date: Mar. 10, 2022

(87) PCT Pub. No.: WO2022/121321
PCT Pub. Date: Jun. 16, 2022

(65) Prior Publication Data
US 2024/0067546 A1    Feb. 29, 2024

(30) Foreign Application Priority Data

Dec. 12, 2020    (CN) .......................... 202011460641.7

(51) Int. Cl.
*C02F 3/00*    (2023.01)
*C02F 3/30*    (2023.01)
(Continued)

(52) U.S. Cl.
CPC .............. *C02F 3/308* (2013.01); *C02F 3/006* (2013.01); *C02F 3/305* (2013.01); *C02F 3/307* (2013.01);
(Continued)

(58) Field of Classification Search
CPC .......... C02F 3/308; C02F 3/006; C02F 3/305; C02F 3/307; C02F 3/341; C02F 11/04;
(Continued)

(56) References Cited

U.S. PATENT DOCUMENTS

| | | | |
|---|---|---|---|
| 2013/0213883 A1* | 8/2013 | Josse ......................... | C02F 3/34 210/601 |
| 2016/0023935 A1* | 1/2016 | Josse ........................ | C02F 3/302 210/601 |
| 2021/0355010 A1* | 11/2021 | Devlin .................... | C02F 3/006 |

FOREIGN PATENT DOCUMENTS

| | | | | |
|---|---|---|---|---|
| CN | 104609650 A | | 5/2015 | |
| CN | 105585122 A | * | 5/2016 | ................ C02F 3/30 |

(Continued)

OTHER PUBLICATIONS

English translation of Patent Publication CN 105217786A, published Jan. 6, 2016. (Year: 2016).*
(Continued)

*Primary Examiner* — Joseph W Drodge
(74) *Attorney, Agent, or Firm* — David R. Stevens; Stevens Law Group

(57) ABSTRACT

A device and method for enhancing nitrogen and phosphorus removal based on a multistage AO partial denitrification coupled with Anammox process in combination with a sludge hydrolytic acidification mixture belong to the technical field of active sludge method wastewater treatment. A system includes a water tank, a water pump, a biochemical reaction zone, a hydrolytic acidification tank and other (Continued)

devices. A multistage AO step-feed pipeline is used to inject raw water into the reaction zone in a segmented manner, guaranteeing efficient utilization of organic matter in the raw water; biofilm carriers are added into an anaerobic zone and anoxic zones to enrich anammox bacteria, and nitrite nitrogen produced by partial denitrification provides a substrate for the anammox bacteria to realize autotrophic nitrogen removal; a nitrification and phosphorus accumulating bacteria aerobic phosphorus uptake are performed in aerobic zones; and part of excess sludge in a secondary sedimentation tank enters the hydrolytic acidification tank to convert macromolecular organic matter into low molecular weight organic matter, a hydrolytic acidification mixture and the excess sludge in the secondary sedimentation tank synchronously flow back to the anaerobic zone, and as a high-quality carbon source, the low molecular weight organic matter can promote partial denitrification. The system provides a novel method for efficient and energy-saving treatment of municipal wastewater.

1 Claim, 1 Drawing Sheet

(51) Int. Cl.
*C02F 3/34* (2023.01)
*C02F 11/04* (2006.01)
*C02F 101/10* (2006.01)
*C02F 101/16* (2006.01)

(52) U.S. Cl.
CPC .............. *C02F 3/341* (2013.01); *C02F 11/04* (2013.01); *C02F 2101/105* (2013.01); *C02F 2101/163* (2013.01); *C02F 2101/166* (2013.01); *C02F 2203/006* (2013.01); *C02F 2209/10* (2013.01); *C02F 2209/22* (2013.01); *C02F 2209/40* (2013.01)

(58) Field of Classification Search
CPC .......... C02F 2101/105; C02F 2101/163; C02F 2101/166; C02F 2203/006; C02F 2209/10; C02F 2209/22; C02F 2209/40; C02F 3/302; C02F 3/303; C02F 3/34; C02F 2101/16; C02F 3/30; C02F 11/02; C02F 1/006; C02F 2001/007; Y02W 10/10; B01D 21/24; B01D 21/2405; B01D 21/2427
See application file for complete search history.

(56) References Cited

FOREIGN PATENT DOCUMENTS

| | | | |
|---|---|---|---|
| CN | 106698816 A | * | 5/2017 |
| CN | 106830324 A | | 6/2017 |
| CN | 206385005 U | * | 8/2017 |
| CN | 105217786 A | | 11/2017 |
| CN | 108545830 A | | 9/2018 |
| CN | 110078303 A | | 8/2019 |
| CN | 110104774 A | | 8/2019 |
| CN | 112645449 A | | 4/2021 |
| JP | 3466444 B2 | | 11/2003 |
| RU | 2636707 C1 | | 11/2017 |

OTHER PUBLICATIONS

English translation of Patent Publication CN 106698816A, published May 24, 2017. (Year: 2017).*
English translation of Patent Publication CN 109231712A, published Jan. 18, 2018. (Year: 2018).*
English translation of Patent Publication CN 108545830A, published Sep. 18, 2018. (Year: 2018).*
English translation of Patent Publication CN 206385005A, published Aug. 8, 2017. (Year: 2017).*
English Translation of Xie Patent Publication CN-105585122-A, published May 18, 2016. (Year: 2016).*
Search Report, PCT/CN2021/107609, Oct. 20, 2021.
Chinese Office Action, Application No. 2020114606417, Oct. 11, 2021.

* cited by examiner

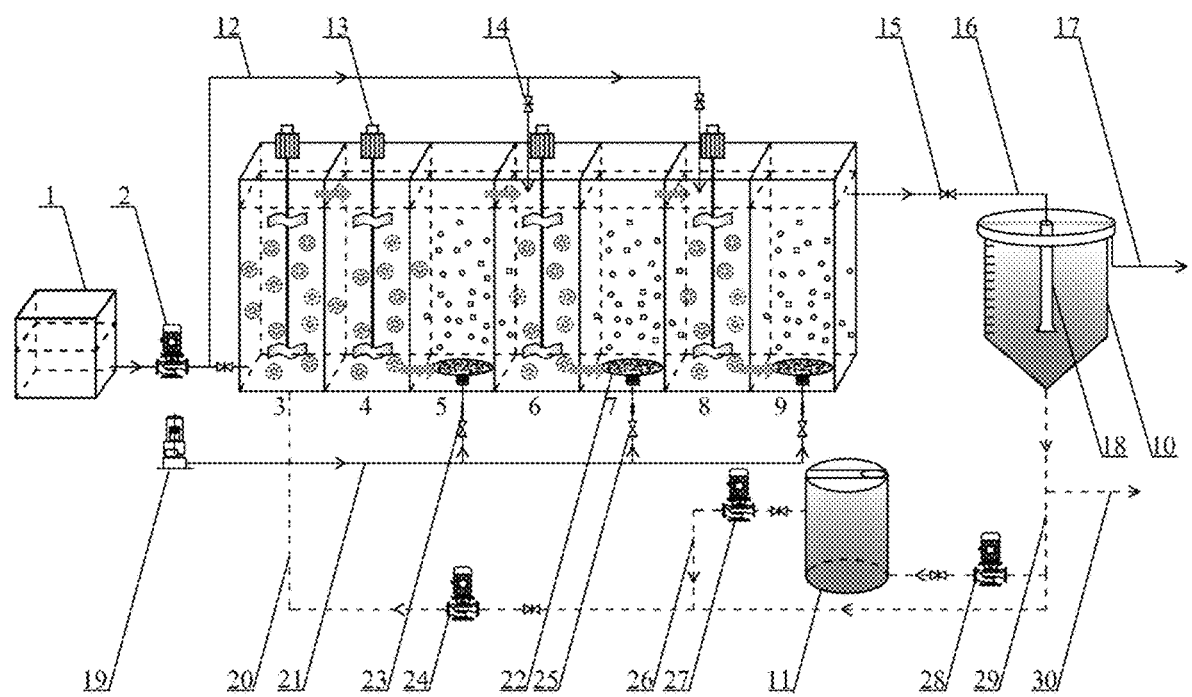

DEVICE AND METHOD FOR ENHANCING NITROGEN AND PHOSPHORUS REMOVAL BASED ON MULTISTAGE AO PARTIAL DENITRIFICATION COUPLED WITH ANAMMOX IN COMBINATION WITH SLUDGE HYDROLYTIC ACIDIFICATION

CROSS REFERENCE TO RELATED APPLICATIONS

This application claims priority to Chinese Patent Application No. 202011460641.7, filed on Dec. 12, 2020 and entitled "DEVICE AND METHOD FOR ENHANCING NITROGEN AND PHOSPHORUS REMOVAL BASED ON MULTISTAGE AO PARTIAL DENITRIFICATION COUPLED WITH ANAMMOX IN COMBINATION WITH SLUDGE HYDROLYTIC ACIDIFICATION", the entire contents of which are incorporated herein by reference.

TECHNICAL FIELD

This application relates to a multistage AO-based partial denitrification coupled with Anammox technology for enhanced nitrogen and phosphorus removal by utilizing a sludge hydrolytic acidification mixture, and belongs to the field of wastewater biotreatment. The technology is applicable to an efficient and energy-saving nitrogen and phosphorus removal process of a municipal wastewater treatment plant (WWTP).

BACKGROUND

The output of municipal wastewater in China is increasing year by year. The discharge of nitrogen, phosphorus and other pollutants in sewage into slow-flow water bodies will cause serious water eutrophication, such as algae outbreak, destruction of an aquatic ecosystem, deterioration of circulating water quality and so on. Biological nitrogen and phosphorus removal from municipal wastewater is considered to be an effective way to solve water eutrophication. At present, most municipal WWTPs in China adopt traditional processes such as A/O, AAO, CAST and oxidation ditches, thereby failing to meet the primary standard A of Discharge Standard of Pollutants for Municipal Wastewater Treatment Plant (GB18918-2002). Improving the effect of nitrogen and phosphorus removal by the traditional processes of the municipal WWTPs has become a major demand in the field of municipal wastewater treatment at this stage.

A municipal wastewater multistage AO step-feed nitrogen and phosphorus removal process is a wastewater treatment process with high application potential at present, and its research and application at home and abroad are still at an initial stage. Compared with the traditional wastewater treatment processes, the municipal wastewater multistage AO step-feed nitrogen and phosphorus removal process has significant advantages: (1) raw water enters anaerobic zones or anoxic zones in a segmented manner, guaranteeing uniform distribution of carbon sources in the raw water in the anaerobic zones and the anoxic zones, denitrifying bacteria utilize this part of carbon sources to reduce nitrate nitrogen produced by nitrification of aerobic zones to nitrite nitrogen through partial denitrification, or nitrogen is directly produced through full denitrification to removal nitrogen, which avoids consumption of heterotrophic bacteria of the aerobic zones to the carbon sources, so the process is especially suitable for treating domestic municipal wastewater with a low C/N ratio; (2) nitrification liquid of the aerobic zones directly enters the anaerobic zones or the anoxic zones without arranging a nitrification liquid backflow pipeline and device, simplifying the system structure and saving the delivery power cost; (3) denitrification occurring in the anaerobic zones and the anoxic zones produces alkalinity, and output water directly enters the aerobic zones, compensating for the alkalinity consumed by the aerobic zones to a certain extent and saving addition of basic substances; and (4) wastewater flows through the anoxic zones and the aerobic zones alternately, producing a certain suppression effect on growth of filamentous bacteria, thereby reducing the risk of sludge bulking.

Partial denitrification coupled with Anammox is considered to be one of the most potential ways for the application of Anammox in the municipal WWTPs. Under certain conditions, with organic matter in wastewater as electron donors and the nitrate nitrogen as electron acceptors, the denitrifying bacteria reduce the nitrate nitrogen to the nitrite nitrogen instead of directly reducing to nitrogen, and thus the nitrite nitrogen generated therefrom can provide a necessary substrate for the Anammox under an anoxic condition for autotrophic nitrogen removal of the Anammox. Partial denitrification coupled with Anammox and the full denitrification are always performed simultaneously, thereby establishing two main nitrogen removal paths, so that stability and high impact load resistance are guaranteed while efficient nitrogen removal is achieved. In addition, various researches show that a partial denitrification process can be better achieved and maintained when low molecular weight organic matter is used as the electron donors.

A device and method for enhancing nitrogen and phosphorus removal based on a multistage AO partial denitrification coupled with Anammox process in combination with a sludge hydrolytic acidification mixture take a multistage AO step-feed mode as a process carrier, a process of coupling partial denitrification with the Anammox is realized therein, and advantages of the two are combined. In addition, hydrolytic acidification of part of excess sludge in a secondary sedimentation tank provides a high-quality micromolecular carbon source for a partial denitrification process in a biochemical reaction zone, which solves the problem of sludge treatment of the municipal WWTPs to a certain extent while promoting the partial denitrification. In summary, the device and method for enhancing nitrogen and phosphorus removal based on the multistage AO partial denitrification coupled with Anammox process in combination with the sludge hydrolytic acidification mixture have the potential to realize efficient and energy-saving treatment of municipal wastewater.

SUMMARY

A method for enhancing nitrogen and phosphorus removal based on a multistage AO partial denitrification coupled with Anammox process in combination with a sludge hydrolytic acidification mixture applies the following device: a raw water tank (1), a feed pump (2), an anaerobic zone (3), a first anoxic zone (4), a first aerobic zone (5), a second anoxic zone (6), a second aerobic zone (7), a third anoxic zone (8), a third aerobic zone (9), a sedimentation tank (10) and a sludge hydrolytic acidification tank (11); wherein the feed pump (2) is connected with the anaerobic zone (3), the second anoxic zone (6) and the third anoxic zone (8) through a step-feed pipeline (12), and each segment of the feed pipeline is provided with a water inlet valve (14); a biochemical reaction zone is formed by sequentially connecting the anaerobic zone (3), the first anoxic zone (4), the first aerobic zone (5), the second anoxic zone (6), the second aerobic zone (7), the third anoxic zone (8) and the third aerobic zone (9), and in practical application, the number and volume of chambers in each zone are flexibly adjusted according to operation conditions; biofilm carriers are added into and submersible mixers (13) are mounted in the three anoxic zones; the three aerobic zones are provided with aeration devices (22), and aeration heads are connected with rotor flow meters (23), air valves (25) and an air compressor (19) through an aeration pipeline (21); the third aerobic zone is provided with an overflow weir, a pipeline of the overflow weir is connected with a secondary sedimentation tank center pipe (18) via a secondary sedimentation tank water inlet pipe (16) and a secondary sedimentation tank water inlet valve (15), and a water outlet of the secondary sedimentation tank (10) is connected with a water outlet pipe (17); a sludge pump (28) and a sludge pipeline (29) are connected between the secondary sedimentation tank (10) and the sludge hydrolytic acidification tank (11), a sludge pump (27) and a sludge pipeline (26) are connected between the sludge hydrolytic acidification tank (11) and a sludge backflow header pipe (20), a sludge backflow pump (24) is connected between the sludge backflow header pipe and the anaerobic zone to make excess sludge and the sludge hydrolytic acidification mixture flow back into the anaerobic zone, and the rest of excess sludge in the secondary sedimentation tank is discharged to a sludge treatment system through a sludge discharging pipeline (30).

A device and method for enhancing nitrogen and phosphorus removal based on a multistage AO partial denitrification coupled with Anammox process in combination with a sludge hydrolytic acidification mixture are provided, wherein, 1) raw water enters an anaerobic zone (3), a second anoxic zone (6) and a third anoxic zone (8) respectively via a feed pump (2) from a raw water tank (1), output water treated through a biochemical reaction zone flows out from a third aerobic zone (9) and flows into a secondary sedimentation tank (10) through a secondary sedimentation tank water inlet pipe (15) and a secondary sedimentation tank center pipe (18), a supernatant in the secondary sedimentation tank is discharged as output water, part of excess sludge at the bottom of the secondary sedimentation tank enters a hydrolytic acidification tank (11) via a sludge pipeline (29), a mixture in the hydrolytic acidification tank and part of the excess sludge in the secondary sedimentation tank flow back into the anaerobic zone together via a sludge backflow header pipe (20), and the rest of the excess sludge in the secondary sedimentation tank is discharged to a sludge treatment system through a sludge discharging pipeline (30).

2) In a multistage AO step-feed system, the raw water enters the anaerobic zone (3), the second anoxic zone (6) and the third anoxic zone (8) in a segmented manner, thereby guaranteeing a stable carbon source of the anaerobic zone and the anoxic zones.

3) Phosphorus accumulating bacteria in the anaerobic zone (3) take volatile fatty acids (VFA) from a raw water and active sludge hydrolytic acidification mixture to synthesize PHAs and release phosphorus.

4) Nitrification liquid from aerobic zones flows back to take nitrate nitrogen into the anaerobic zone (3), the second anoxic zone (6) and the third anoxic zone (8), and denitrifying bacteria utilize organic matter as electron donors to perform a partial denitrification process so as to provide a substrate, nitrite nitrogen, for anammox bacteria, thereby realizing coupling of partial denitrification and the Anammox.

5) Biofilm carriers are added into the anaerobic and anoxic zones and evenly mix and fully contact active sludge through submersible mixers (13), the biofilm carriers provide an attachment condition for enrichment and proliferation of the anammox bacteria, and the anammox bacteria realize autotrophic nitrogen removal with ammonia nitrogen in the raw water and the nitrite nitrogen produced in the partial denitrification process as substrates.

6) The aerobic zones can finally oxidize the ammonia nitrogen in the raw water into nitrate nitrogen under the action of nitrifying bacteria, the phosphorus accumulating bacteria in the aerobic zones can perform an aerobic phosphorus uptake process with own PHAs as electron donors and oxygen as electron acceptors, and part of phosphorus-rich sludge is discharged out of the system from the secondary sedimentation tank so as to realize removal of phosphorus in wastewater.

7) Part of excess sludge enters a hydrolytic acidification tank via a sludge pipeline and is subjected to hydrolytic acidification under an anaerobic condition to convert macromolecular organic matter into low molecular weight organic matter, the hydrolytic acidification mixture and part of the excess sludge in the secondary sedimentation tank flow back into the anaerobic zone together, and while a stable sludge concentration in the system is guaranteed, the low molecular weight organic matter, as a high-quality carbon source, further promotes the partial denitrification process.

A method for enhancing nitrogen and phosphorus removal based on a multistage AO partial denitrification coupled with Anammox process in combination with a sludge hydrolytic acidification mixture includes the following steps:

adding excess sludge in a secondary sedimentation tank of a municipal WWTPs into a biochemical reaction zone as seed sludge, raw water entering an anaerobic zone, a second anoxic zone and a third anoxic zone of a reactor after flowing through a step-feed pipeline through a feed pump, and controlling a ratio of water inlet volumes of the three segments to be 4:3:3; controlling a reflux ratio of the excess sludge to a sludge hydrolytic acidification mixed liquid to be 100%-150%, the sludge and the sludge hydrolytic acidification liquid synchronously flowing back to the anaerobic zone, and maintaining mixed liquid suspended solids (MLSS) in the reactor to be 4000-5000 mg/L; when a sludge hydrolytic acidification effect in a hydrolytic acidification tank at an initial stage is not obvious, adding a carbon source into a raw water tank to make a raw water C/N ratio be 3-5, and stopping adding the carbon source after starting of the sludge hydrolytic acidification tank is completed; by monitoring dissolved oxygen (DO) of an aerobic segment through a real-time monitoring system, controlling DO of a first aerobic zone to be 1-1.5 mg/L, and controlling DO of a second aerobic zone and a third aerobic zone to be 2-3 mg/L; adjusting hydraulic retention time (HRT) of each segment by controlling flow of each segment of a system so as to maintain the HRT of the biochemical reaction zone at 12-14 h and HRT anaerobic zone:HRT anoxic zone:HRT aerobic zone=1:3:3; by controlling a direct sludge discharging amount of the excess sludge in the secondary sedimentation tank, maintaining sludge retention time (SRT) in the biochemical reaction zone to be 13-15 days; and controlling a submersible mixing speed to make the biofilm carriers and active sludge in the anaerobic zone and the anoxic zones mix evenly and fully contact.

The device and method for enhancing nitrogen and phosphorus removal based on the multistage AO partial denitrification coupled with Anammox process in combination with the sludge hydrolytic acidification mixture take a multistage AO step-feed mode as a process carrier, a process of coupling partial denitrification with the Anammox is realized therein, and advantages of the two are combined. In addition, hydrolytic acidification of part of the excess sludge in the secondary sedimentation tank provides a high-quality micromolecular carbon source for the partial denitrification process in the biochemical reaction zone, which solves the problem of sludge treatment of the municipal WWTPs to a certain extent while promoting the partial denitrification. In summary, the device and method for enhancing nitrogen and phosphorus removal based on the multistage AO partial denitrification coupled with Anammox process in combination with the sludge hydrolytic acidification mixture have the potential to realize efficient and energy-saving treatment of municipal wastewater.

BRIEF DESCRIPTION OF THE DRAWINGS

FIG. 1 is a schematic structural diagram of a system for enhancing nitrogen and phosphorus removal based on municipal wastewater continuous flow step-feed denitrification part anaerobic ammonia oxidation coupled with sludge hydrolytic acidification of this application.

In FIG. 1: 1—raw water tank; 2—feed pump; 3—anaerobic zone; 4—first anoxic zone; 5—first aerobic zone; 6—second anoxic zone; 7—second aerobic zone; 8—third anoxic zone; 9—third aerobic zone; 10—sedimentation tank; 11—sludge hydrolytic acidification tank; 12—step-feed pipeline; 13—submersible mixer; 14—water inlet valve; 15—secondary sedimentation tank water inlet valve; 16—secondary sedimentation tank water inlet pipe; 17—water outlet pipe; 18—secondary sedimentation tank center pipe; 19—air compressor; 20—sludge backflow header pipe; 21—aeration pipeline; 22—aeration device; 23—rotor flow meter; 24—sludge backflow pump; 25—air valve; 26—sludge pipeline; 27—sludge pump; 28—sludge pump; 29—sludge pipeline.

DETAILED DESCRIPTION

In combination with FIG. 1, implementations of this application are specifically described.

1) Raw water enters an anaerobic zone (3), a second anoxic zone (6) and a third anoxic zone (8) respectively via a feed pump (2) from a raw water tank (1), output water treated through a biochemical reaction zone flows out from a third aerobic zone (9) and flows into a secondary sedimentation tank (10) through a secondary sedimentation tank water inlet pipe (15) and a secondary sedimentation tank center pipe (18), a supernatant in the secondary sedimentation tank is discharged as output water, part of excess sludge at the bottom of the secondary sedimentation tank enters a hydrolytic acidification tank (11) via a sludge pipeline (29), a mixture in the hydrolytic acidification tank and part of the excess sludge in the secondary sedimentation tank flow back into the anaerobic zone together via a sludge backflow header pipe (20), and the rest of the excess sludge in the secondary sedimentation tank is discharged to a sludge treatment system through a sludge discharging pipeline (30).

2) In a multistage AO step-feed system, the raw water enters the anaerobic zone (3), the second anoxic zone (6) and the third anoxic zone (8) in a segmented manner, thereby guaranteeing a stable carbon source of the anaerobic zone and the anoxic zones.

3) Phosphorus accumulating bacteria in the anaerobic zone (3) take volatile fatty acids (VFA) from a raw water and active sludge hydrolytic acidification mixture to synthesize PHAs and release phosphorus.

4) Nitrification liquid from aerobic zones flows back to take nitrate nitrogen into the anaerobic zone (3), the second anoxic zone (6) and the third anoxic zone (8), and denitrifying bacteria utilize organic matter as electron donors to perform a partial denitrification process so as to provide a substrate, nitrite nitrogen, for anammox bacteria, thereby realizing coupling of partial denitrification and the Anammox.

5) Biofilm carriers are added into the anaerobic zone and the anoxic zones and evenly mix and fully contact active sludge through submersible mixers (13), the biofilm carriers provide an attachment condition for enrichment and proliferation of the anammox bacteria, and the anammox bacteria realize autotrophic nitrogen removal with ammonia nitrogen in the raw water and the nitrite nitrogen produced in the partial denitrification process as substrates.

6) The aerobic zones can finally oxidize the ammonia nitrogen in the raw water into nitrate nitrogen under the action of nitrifying bacteria, the phosphorus accumulating bacteria in the aerobic zones can perform an aerobic phosphorus uptake process with own PHAs as electron donors and oxygen as electron acceptors, and part of phosphorus-rich sludge is discharged out of the system from the secondary sedimentation tank so as to realize removal of phosphorus in wastewater.

7) Part of the excess sludge enters the hydrolytic acidification tank via a sludge pipeline and is subjected to hydrolytic acidification under an anaerobic condition to convert macromolecular organic matter into low molecular weight organic matter, the hydrolytic acidification mixture and part of the excess sludge in the secondary sedimentation tank flow back into the anaerobic zone together, and while a stable sludge concentration in the system is guaranteed, the low molecular weight organic matter, as a high-quality carbon source, further promotes the partial denitrification process.

Specific Steps:

excess sludge in a secondary sedimentation tank of a municipal WWTPs is added into a biochemical reaction zone as seed sludge, raw water enters an anaerobic zone, a second anoxic zone and a third anoxic zone of a reactor after flowing through a step-feed pipeline through a feed pump, and a ratio of water inlet volumes of the three segments is controlled to be 4:3:3; the reflux ratio of the excess sludge to a sludge hydrolytic acidification mixed liquid is controlled to be 100%-150%, the sludge and the sludge hydrolytic acidification liquid synchronously flow back to the anaerobic zone, and mixed liquid suspended solids (MLSS) in the reactor is maintained to be 4000-5000 mg/L; when a sludge hydrolytic acidification effect in a hydrolytic acidification tank at an initial stage is not obvious, a carbon source is added into a raw water tank to make a raw water C/N ratio be 3-5, and adding of the carbon source is stopped after starting of the sludge hydrolytic acidification tank is completed; by monitoring dissolved oxygen (DO) of an aerobic segment through a real-time monitoring system, DO of a first aerobic zone is controlled to be 1-1.5 mg/L, and DO of a second aerobic zone and a third aerobic zone is controlled to be 2-3 mg/L; hydraulic retention time (HRT) of each segment is adjusted by controlling flow of each segment of a system so as to maintain the HRT of the biochemical reaction zone at 12-14 h and HRT anaerobic zone:HRT anoxic zone:HRT aerobic zone=1:3:3; by controlling a direct sludge discharging amount of the excess sludge in the secondary sedimentation tank, sludge retention time in the biochemical reaction zone is maintained to be 13-15 days; and a submersible mixing speed is controlled to make the biofilm carriers and active sludge in the anaerobic zone and the anoxic zones mix evenly and fully contact.

The device and method for enhancing nitrogen and phosphorus removal based on the multistage AO partial denitrification coupled with Anammox process in combination with the sludge hydrolytic acidification mixture take a multistage AO step-feed mode as a process carrier, a process of coupling partial denitrification with the Anammox is realized therein, and advantages of the two are combined. In addition, hydrolytic acidification of part of the excess sludge in the secondary sedimentation tank provides a high-quality micromolecular carbon source for the partial denitrification process in the biochemical reaction zone, which solves the problem of sludge treatment of the municipal WWTPs to a certain extent while promoting the partial denitrification. In summary, the device and method for enhancing nitrogen and phosphorus removal based on the multistage AO partial denitrification coupled with Anammox process in combination with the sludge hydrolytic acidification mixture have the potential to realize efficient and energy-saving treatment of municipal wastewater.

What is claimed is:

1. A method for enhancing nitrogen and phosphorus removal based on a multistage AO partial denitrification coupled with an Anammox process in combination with a sludge hydrolytic acidification mixture, comprising the following steps:

adding excess sludge in a secondary sedimentation tank of a municipal wastewater treatment plant (WWTPs) into a biochemical reaction zone as seed sludge, a ratio of water inlet volumes of a first anaerobic zone to a second anoxic zone to a third anoxic zone of a reactor being 4:3:3;

controlling a reflux ratio of the excess sludge to a sludge hydrolytic acidification mixed liquid to be 100%-150%, the excess sludge and the sludge hydrolytic acidification liquid synchronously flowing back to the anaerobic zone, and maintaining mixed liquid suspended solids (MLSS) in the reactor to be 4000-5000 mg/L;

at a start stage of a hydrolytic acidification tank, adding a carbon source into a raw water tank, controlling a C/N ratio of raw water within the raw water tank to be 3-5, and stopping adding of the carbon source after starting of the sludge hydrolytic acidification tank is completed;

monitoring dissolved oxygen (DO) of a first aerobic zone, a second aerobic zone and a third aerobic zone of the reactor through a real-time monitoring system, controlling DO of the first aerobic zone to be 1-1.5 mg/L, and controlling DO of the second aerobic zone and the third aerobic zone to be 2-3 mg/L;

adjusting hydraulic retention time (HRT) by controlling flow of raw water from the anaerobic zone, the second anoxic zone and the third anoxic zone into the biochemical reaction zone, so as to maintain the HRT of the biochemical reaction zone at 12-14 h and at a ratio of anaerobic zone HRT:anoxic zones HRT:aerobic zones HRT=1:3:3;

by controlling a direct sludge discharging amount of the excess sludge in the secondary sedimentation tank, maintaining sludge retention time in the biochemical reaction zone to be 13-15 days; and controlling a submersible mixing speed to make the biofilm carrier and active sludge in the anaerobic zone and a first anoxic zone, the second anoxic zone and the third anoxic zone mix evenly and fully contact each other.

* * * * *